United States Patent [19]

Person et al.

[11] Patent Number: 5,645,033
[45] Date of Patent: Jul. 8, 1997

[54] METHOD AND ARRANGEMENT FOR CONTROLLING THE DRIVE POWER OF A MOTOR VEHICLE

[75] Inventors: Martin Person, Oberriexingen; Martin Streib, Vaihingen; Thomas Mössner, Pforzheim; Tobias Roulet, Leonberg, all of Germany

[73] Assignee: Robert Bosch GmbH, Stuttgart, Germany

[21] Appl. No.: 301,814

[22] Filed: Sep. 8, 1994

[30] Foreign Application Priority Data

Sep. 8, 1993 [DE] Germany ............... 43 30 368.4

[51] Int. Cl.⁶ ........................................... F02D 7/00
[52] U.S. Cl. ............................ 123/399; 123/559.3
[58] Field of Search ................. 123/559.3, 559.1, 123/399, 585, 561, 564, 559.2, 434

[56] References Cited

U.S. PATENT DOCUMENTS

| | | | |
|---|---|---|---|
| 4,766,873 | 8/1988 | Miyagi et al. | 123/559.3 |
| 4,800,863 | 1/1989 | Miyagi et al. | 123/559.3 |
| 4,875,454 | 10/1989 | Okimoto et al. | 123/559.3 |
| 5,115,778 | 5/1992 | Sasaki et al. | 123/559.3 |
| 5,150,693 | 9/1992 | Ohnaka et al. | 123/559.3 |
| 5,307,783 | 5/1994 | Satoya et al. | 123/559.3 |

FOREIGN PATENT DOCUMENTS 3303350  8/1984  Germany.

OTHER PUBLICATIONS

"Elektronische Motorsteuerung für Kraftfahrzeuge" by G. Kolberg, MTZ Motortechnische Zeitschrift, vol. 46, No. 4, 1985.

*Primary Examiner*—Raymond A. Nelli
*Attorney, Agent, or Firm*—Walter Ottesen

[57] ABSTRACT

The invention is directed to a method and an arrangement for controlling the drive power of a motor vehicle equipped with a chargeable spark-ignition engine. In this method and arrangement, the engine power is adjusted via the air input and the charging pressure independently of each other as a function of the accelerator pedal deflection. In one range of the accelerator pedal deflection, the engine power is adjusted by adjusting an engine power actuator in dependence upon the accelerator pedal deflection and/or, in another range, the charging pressure is adjusted in dependence upon the accelerator pedal deflection.

13 Claims, 4 Drawing Sheets

METHOD AND ARRANGEMENT FOR CONTROLLING THE DRIVE POWER OF A MOTOR VEHICLE

FIELD OF THE INVENTION

The invention relates to a method and an arrangement for controlling the drive power of a motor vehicle equipped with a chargeable spark-ignition engine.

BACKGROUND OF THE INVENTION

German patent publication 3,303,350 discloses a control arrangement for the drive power of a motor vehicle wherein the drive power is adjusted by a control of the charging pressure of a turbocharger. This adjustment is in addition to the adjustment via the mechanical throttle flap actuable by the driver. For this purpose, a desired charging pressure is determined via a closed-loop control circuit on the basis of the throttle flap position and the engine speed and is compared to the actual charging pressure. The actual charging pressure is adjusted via a controller by actuating a bypass valve across the turbine of the charger. Also, a precontrol of the charging pressure is provided which adjusts the charging pressure at least in dependence upon the above-mentioned operating variables while bypassing the controller. Desired value input and precontrol values are dimensioned to obtain high power, low fuel consumption and favorable exhaust-gas values.

An internal combustion engine equipped with a turbocharger or a mechanical charger generates a maximum torque at a pregiven rpm when the throttle flap is fully opened and the charging pressure is at a maximum because this results in a maximum cylinder charge. If a lesser torque is required from the engine, then the cylinder charge must be reduced in the same manner as for an induction engine. Stated otherwise, the pressure in the intake pipe must be reduced, that is, the pressure downstream of the throttle flap in the intake system. In known control arrangements, the charging pressure (that is, the pressure upstream of the throttle flap in the intake system) is adjusted in dependence upon the position of the throttle flap pregiven by the driver or the accelerator pedal position proportional to this throttle flap position. For this reason, a reduction of the torque output of the engine takes place primarily because of a throttling of the pressure in the intake pipe as a consequence of the throttle flap being pivoted in the closed direction by the driver.

This, however, leads to the situation that the efficiency of the engine is reduced because of the throttling of the inducted air flow by adjusting the throttle flap. Accordingly, the engine operates at an unfavorable efficiency.

SUMMARY OF THE INVENTION

It is an object of the invention to provide a method and an arrangement wherein the power or torque of a chargeable internal combustion engine is adjusted so that the engine operates in the range of a more favorable efficiency.

This object is achieved in that the charging pressure and throttle flap angle are adjusted independently of each other at least each in dependence upon the command of the driver or in dependence upon an input value of a speed controller. This is done in such a manner that in at least one range of driver command or of the input value, the power is adjusted on the basis of the adjustment of the charging pressure while the throttle flap remains essentially unchanged.

A further improvement is provided in that, in a first range of the driver command or of the input value, the control of the power takes place primarily on the basis of the adjustment of the throttle flap angle and, in a second range of the driver command or of the input value, the adjustment of the power takes place primarily on the basis of the adjustment of the charging pressure.

An engine power control system is disclosed in the article entitled "Elektronische Motorsteuerung fur Kraftfahrzeuge" published in Motortechnische Zeitschrift, number 46 (1985), volume 4, pages 129 to 133. In this system, the engine power is adjusted by adjusting a throttle flap on the basis of the driver command via an electrical path. Various functions are described which can be defined by intervening in the dependency of driver command on throttle flap position.

The invention is based on the realization that the reduction of torque by reducing the charging pressure (while the throttle flap remains unchanged or almost unchanged) is more favorable than a throttling of the engine by adjusting the throttle flap. The above realization is applicable to engines with turbochargers or with a mechanical charger.

The invention therefore permits the power of the engine to be adjusted on the basis of the driver command for an internal combustion engine having a charger in the sense of an improvement or optimization of the efficiency because a reduction of the engine power without throttling of the inducted air is made possible.

In addition, an engine torque desired by the driver by deflecting the accelerator pedal can be adjusted with the least possible throttling of the air flow supplied to the engine over the entire range of the accelerator pedal deflection by the control of the throttle flap position and charging pressure independently of each other.

For realizing the concept of the invention, it is especially advantageous that the throttle flap is opened disproportionately wide on the basis of the accelerator pedal position in a first range for small deflections of the accelerator pedal while the charging pressure remains at its minimum value; whereas, in a second range, toward larger deflections of the accelerator pedal for a wide open throttle flap, the charging pressure is increased in dependence upon the accelerator pedal until it reaches its maximum at the full throttle position of the accelerator pedal.

It has been shown to be especially advantageous that, in the first range (preferably 50%) of the accelerator pedal path, the power of the engine is controlled by adjusting the throttle flap up to its maximum opening at which the throttle flap only insignificantly throttles the air flow; whereas, in the remaining range of the accelerator pedal path, the power is controlled by adjusting the charging pressure.

It has here been shown advantageous to select the dependency of the throttle flap position and the charging pressure on the accelerator pedal position pursuant to pregiven function curves which effect an optimal cylinder charge in the particular operating state with respect to power and fuel consumption. This leads to linear, progressive and/or degressive function curves with operating variables such as engine rpm, air temperature and/or elevation above sea level also being considered.

It is also advantageous to insert a third range between the two ranges wherein a common adjustment of the throttle flap and charging pressure takes place in dependence upon the driver command.

The invention is especially advantageous also for a speed controller which determines an input value for the engine power in dependence upon the desired value. In the material which follows, this is likewise understood to be a driver command.

Also, the term "turbocharger" includes turbochargers as well as mechanical charging systems.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
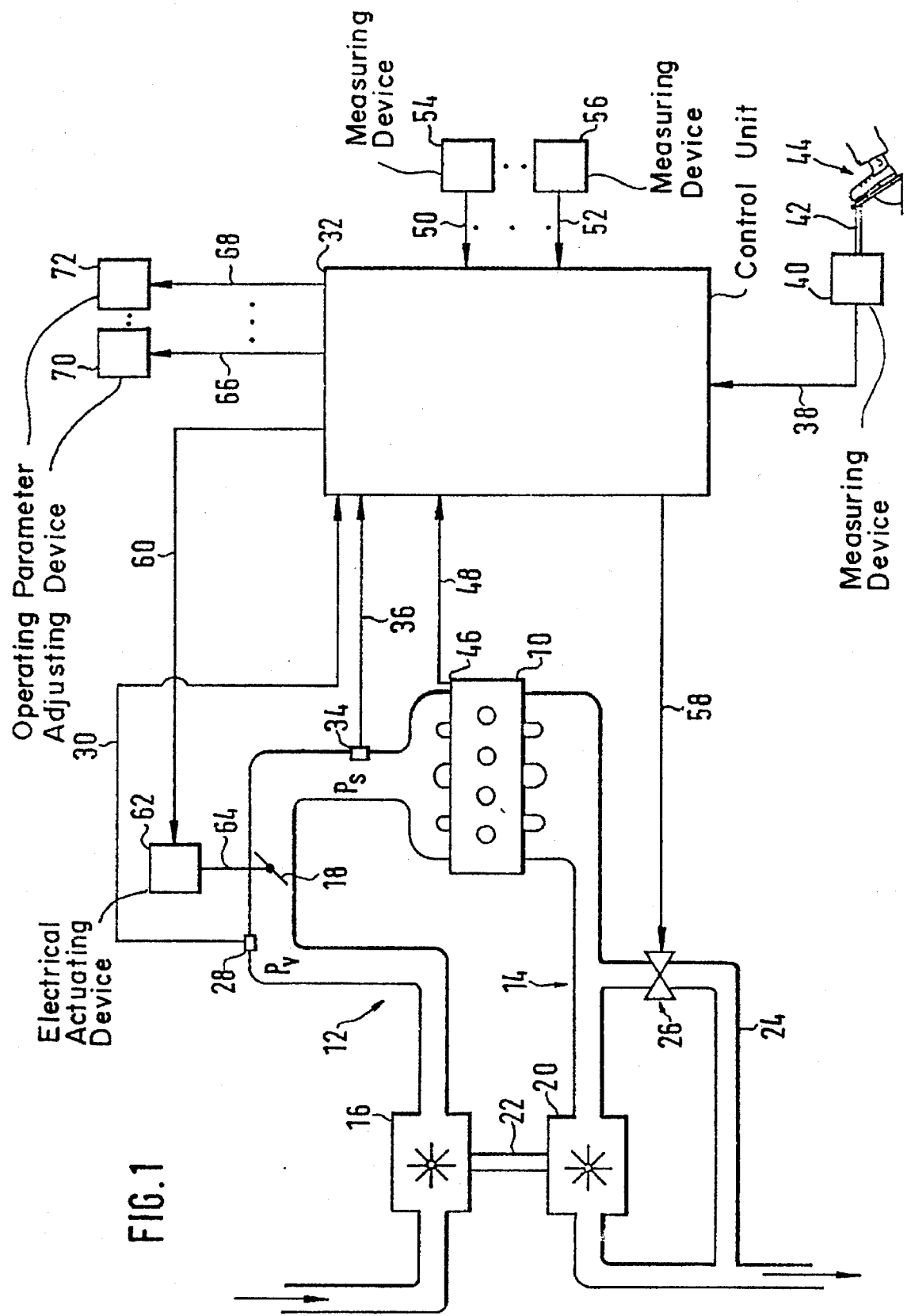
FIG. 1 is an overview block circuit diagram of a drive unit of a motor vehicle having a control arrangement for adjusting the drive power.

In FIG. 1, an internal combustion engine 10 includes an air intake system 12 as well as an exhaust system 14. The compressor wheel 16 of a turbocharger is mounted in the intake system 12; whereas, an electrically actuated throttle flap 18 is disposed downstream of the compressor wheel. A turbine 20 of the turbocharger is provided in the exhaust system 14 and is connected via a mechanical connection 22 to the compressor wheel 16. The exhaust system 14 further includes a bypass channel 24 which bridges the turbine 20 and wherein an electromagnetic valve 26 is mounted for controlling the exhaust-gas flow through the bypass channel 24 and therefore through the turbine 20.

The arrangement shown in FIG. 1 further includes a measuring device 28 for detecting the charger pressure PV upstream of the throttle flap 18. The measuring device is connected via a line 30 to a control unit 32. Furthermore, a measuring device 34 detects the intake pressure PS downstream of the throttle flap 18. The measuring device 34 is connected via a line 36 to the control unit 32. A line 38 also leads to the control unit 32 and is connected to measuring device 40 for detecting the command of the driver. The measuring device 40 is connected via a mechanical connection 42 to an operator-controlled element 44 actuable by the driver. The operator-controlled element 44 is here an accelerator pedal. A measuring device 46 detects the engine rpm and is connected via line 48 to the control unit 32. The control unit includes further input lines 50 to 52 which are connected to measuring devices 54 to 56, respectively, for detecting additional operating variables of the engine, of the drive system or of the vehicle. A first output line 58 connects the control unit 32 to the valve 26 for controlling the charging pressure. An output line 60 is provided which leads from the control unit 32 to an electric actuating device 62 which is connected via a mechanical connection 64 to the throttle flap 18. Output lines 66 to 68 lead to units 70 to 72 which adjust other operating parameters of the engine or of the vehicle such as fuel metering and/or ignition and/or control a transmission unit.

The operation of the arrangement shown in FIG. 1 will now be described.

The control unit 32 forms a proportion for the command of the driver on the basis of the deflection of the accelerator pedal. This deflection is detected by the measuring device 40 and is supplied to the control unit 32 via the line 38. The control unit 32 then forms adjusting values for the throttle flap position and/or the charging pressure on the basis of the detected command of the driver in accordance with a pregiven strategy described below and taking into account the torque supplied by the engine. Additional operating parameters can be considered such as engine rpm supplied via the line 48, battery voltage, the engine temperature, travel speed, intake pressure, et cetera, which are detected by the measuring devices 54 to 56 and 34. The formed adjusting values are then either converted into drive signals, preferably, into clocked drive signals for the corresponding actuator. This conversion takes place either in the context of open-loop controls or in the context of closed-loop controls, for example, a position controller for the throttle flap and/or a pressure controller for the charging pressure. These drive signals are emitted via lines 58 and 60, respectively, and the throttle flap and valve 26 are adjusted to the pregiven value of the throttle flap position and charging pressure PV, respectively. A control of the charging pressure can be carried out on the basis of the detected charging pressure PV or on the basis of the intake pressure PS while considering the throttle flap position which is detected by measuring devices 54 and 56. Furthermore, the control unit 32 includes means for controlling fuel injection, ignition and/or a transmission unit in a conventional manner.

In addition to the single control unit 32 shown, the function of adjusting charging pressure and the function of controlling the throttle flap can be carried out in two control units separately from each other. These control units exchange the necessary data via a line system.

Figure 2:
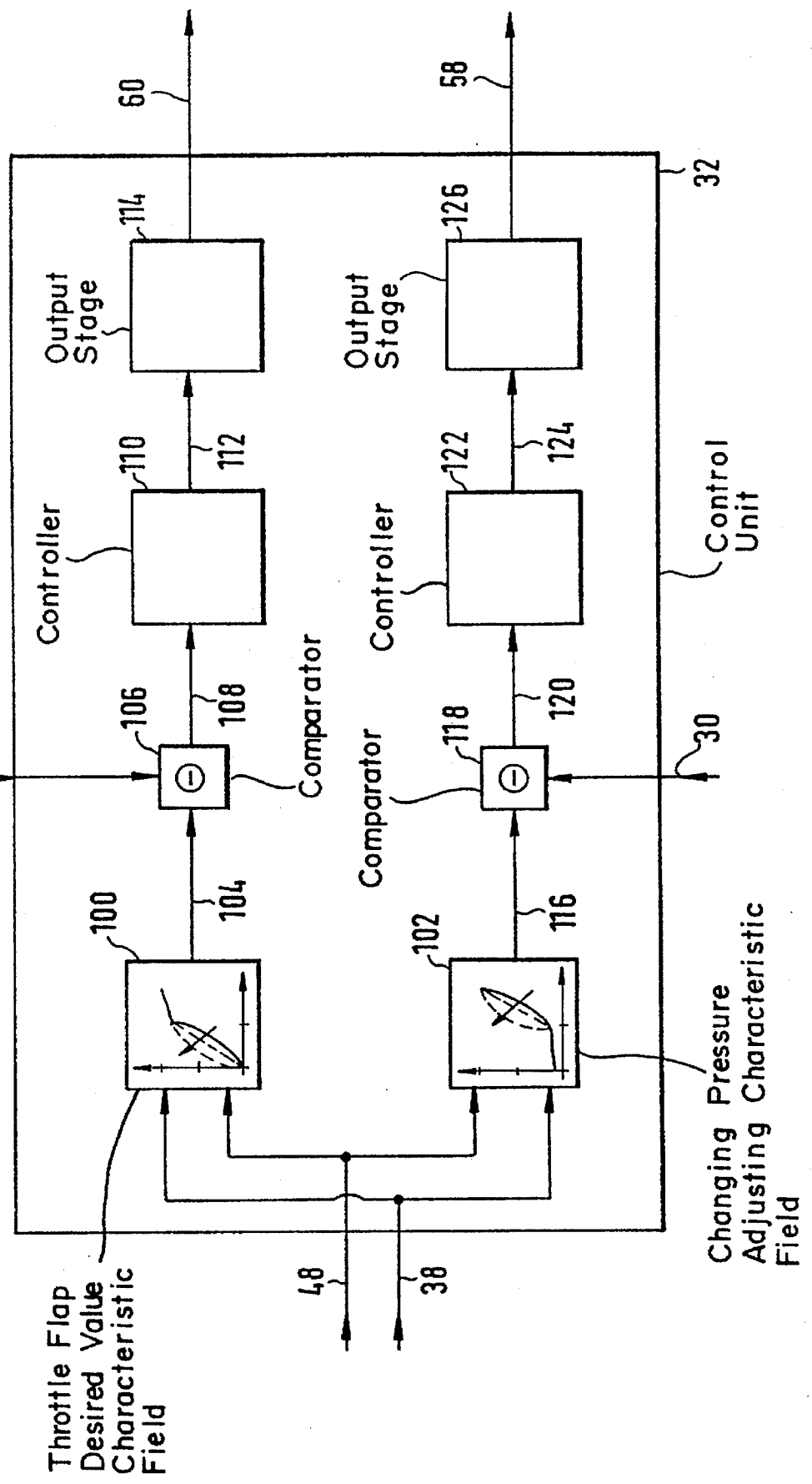
FIG. 2 is an overview block circuit diagram of the control arrangement according to the invention.

FIG. 2 shows a detailed block circuit diagram of the control unit of the invention with respect to a preferred embodiment. The elements already identified with respect to FIG. 1 are here identified by the same reference numerals.

The lines 48 and 38 lead to control unit 32 and carry respective measuring values with respect to the engine rpm Nmot and the accelerator pedal position beta. Both lines lead to a throttle flap desired value characteristic field 100 as well as to a charging pressure adjusting characteristic field 102. The output line 104 of the throttle flap desired value characteristic field 100 leads to a comparator unit 106. One of the lines 50 to 52 leads to comparator unit 106 and, on this line, a measured value for the position of the throttle flap is transmitted. The output line 108 of the comparator 106 leads to a controller 110 having an output signal 112 which goes to an output stage 114. The output line of the output stage 114 defines the line 60 for driving the throttle flap 18. In a comparable manner, the output line 116 of the charging pressure adjusting characteristic field 102 leads to a second comparator 118 to which a line 30 is also connected. The output line 120 of the comparator 118 leads to a second controller 122 and the output line 124 thereof leads to output stage 126. The output line for the output stage 126 defines the drive line 58 for actuating the valve 26 controlling the charging pressure.

The throttle flap adjusting angle is read out of characteristic field 100 on the basis of the values of engine speed and accelerator pedal position supplied to the characteristic field. Various dependencies according to governing peripheral conditions can be pregiven. In a preferred embodiment, the throttle flap adjusted position is dependent upon the accelerator pedal position in a first range up to approximately half of the accelerator pedal position. This dependency is linear, progressive or degressive. The particular characteristic curve is selected on the basis of engine rpm and additionally on the basis of the transmission setting in a preferred embodiment; whereas, in a second range, the throttle flap is adjusted essentially constant to its fully opened position or to a position wherein the throttling of the engine is low. This second range is between approximately half the deflected accelerator pedal position and the fully deflected accelerator pedal position. The desired value determined in this way is emitted via line 104 to the comparator 106 where the desired value is compared to the actual value for forming a control deviation. The determined control deviation is outputted via line 108 to controller 110 which, in a preferred embodiment, is configured as a PID-controller. The controller 110 determines an output signal in accordance with its control strategy and this output signal is a quantity for driving the actuator. This output signal is emitted via the line 112 to the output stage 114 which controls the current throughflow through the actuating motor 62 in the sense o The basic character drive signal.

The basic characteristic field dependency results in a preferred embodiment in that the throttle flap angle becomes greater with increasing accelerator pedal position and with increasing engine rpm (or road speed), the dependency is converted from a progressive curve into a degressive curve.

In a comparative manner, the adjusting value for the charging pressure is pregiven in the characteristic field 102 in dependence upon the accelerator pedal position beta and the engine rpm Nmot. Here too, a desired dependency can be adjusted in accordance with peripheral conditions. In a preferred embodiment, in the first range (during the first half of the deflection of the accelerator pedal), the desired value for the charging pressure is maintained essentially at its minimum value; whereas, in the second range, (that is, the second half of the accelerator pedal deflection), a rpm-dependent progressive, linear and/or degressive dependency of the charging pressure adjusting value on the accelerator pedal position is pregiven. This desired value is emitted via the line 116 to the comparator 118 where the desired value is compared to the charging pressure actual value supplied via line 30 to form the control deviation. The control deviation is conducted via the line 120 to controller 122 which, in a preferred embodiment, is defined as being a proportional-integral controller. This controller determines an output signal which corresponds to the extent and direction of the control deviation and emits this signal as a drive signal to the valve 26 via the line 124 and the output stage 126 as well as the output line 58. The valve 26 adjusts the exhaust-gas flow flowing through the turbine 20 in a clocked manner so that the charging pressure actual value is controlled to the desired value.

For the input of the characteristic fields 100 and 102, it should be noted that the driving performance of the motor vehicle experienced by the driver must be adapted to the curve of the engine torque plotted against the rpm in dependence upon the accelerator pedal. This adaptation should preferably be in the direction of an optimal power or of an optimal consumption of fuel. In addition, no jump in the driving performance of the motor vehicle should occur in the outputted torque during the transition from the throttle flap position adjustment to the charging pressure adjustment. In a preferred embodiment, this can be considered in that, in the transition region, an adjustment of the throttle flap as well as an adjustment of the charging pressure take place. The increase of the throttle flap position and of the charging pressure is selected in such a manner in dependence upon the increase of accelerator pedal deflection that, by the composite of the foregoing, the engine torque wanted by the driver by actuating the accelerator pedal is made available. As a rule, the increases of the throttle flap characteristic curve and the charging pressure characteristic curve are flatter in this range than in the active range.

In addition to the described limit value of approximately 50% of the accelerator pedal deflection, this value can be reduced or increased in an advantageous manner in other embodiments of the invention. It is purposeful for the value to have a value range of 30% to 80% of the accelerator pedal deflection. The characteristic field values optimal for the particular application are determined in driving experiments.

Figure 3:
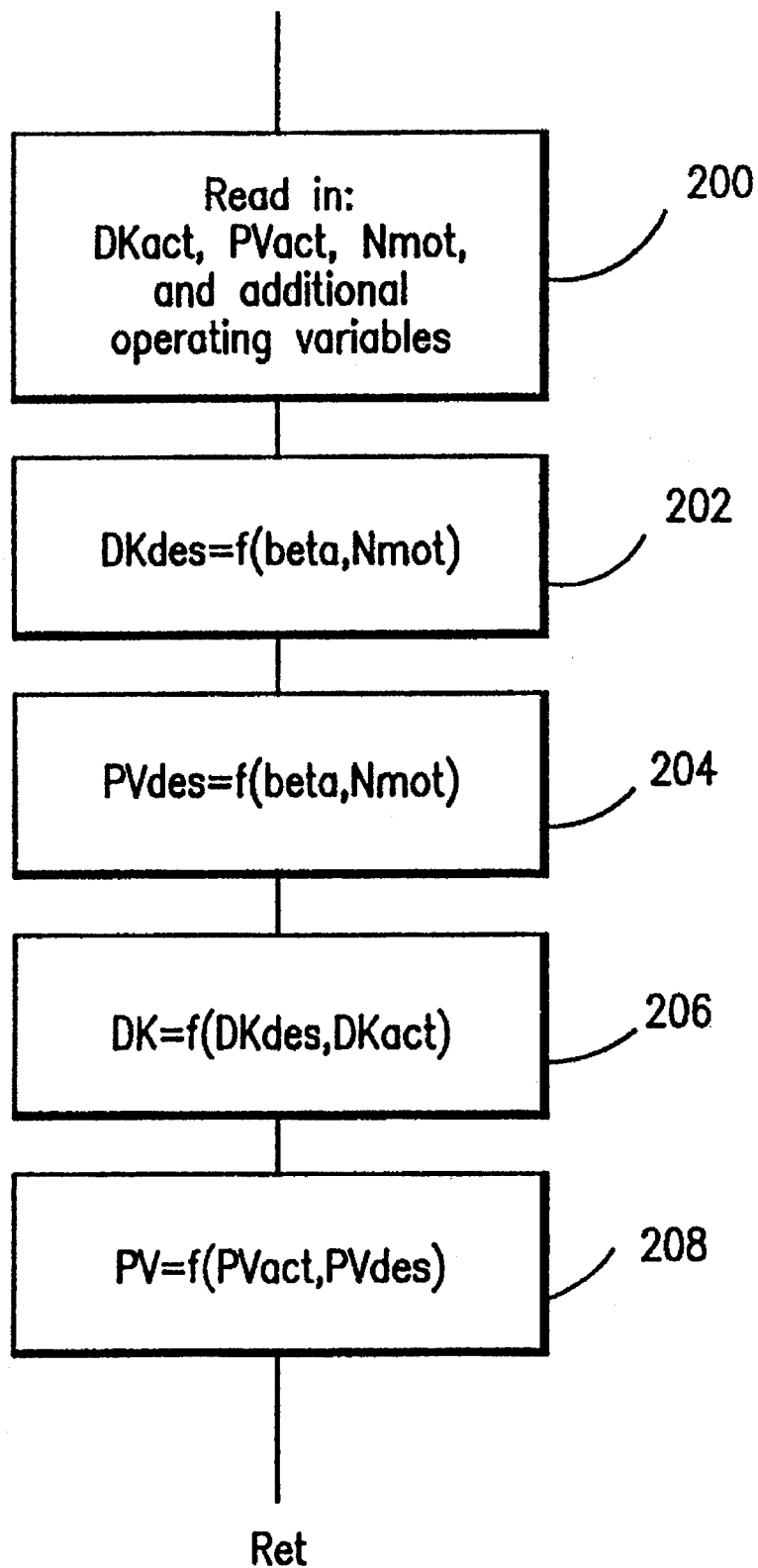
FIG. 3 is a flowchart for showing an embodiment of the method of the invention; and, FIG. 4 is a graph showing the characteristic field curve of the throttle flap desired value (DKdes) as a function of accelerator pedal position value (beta) and the characteristic field curve of the charging pressure desired value (PVdes) likewise as a function of accelerator pedal position value (beta).
Figure 4:
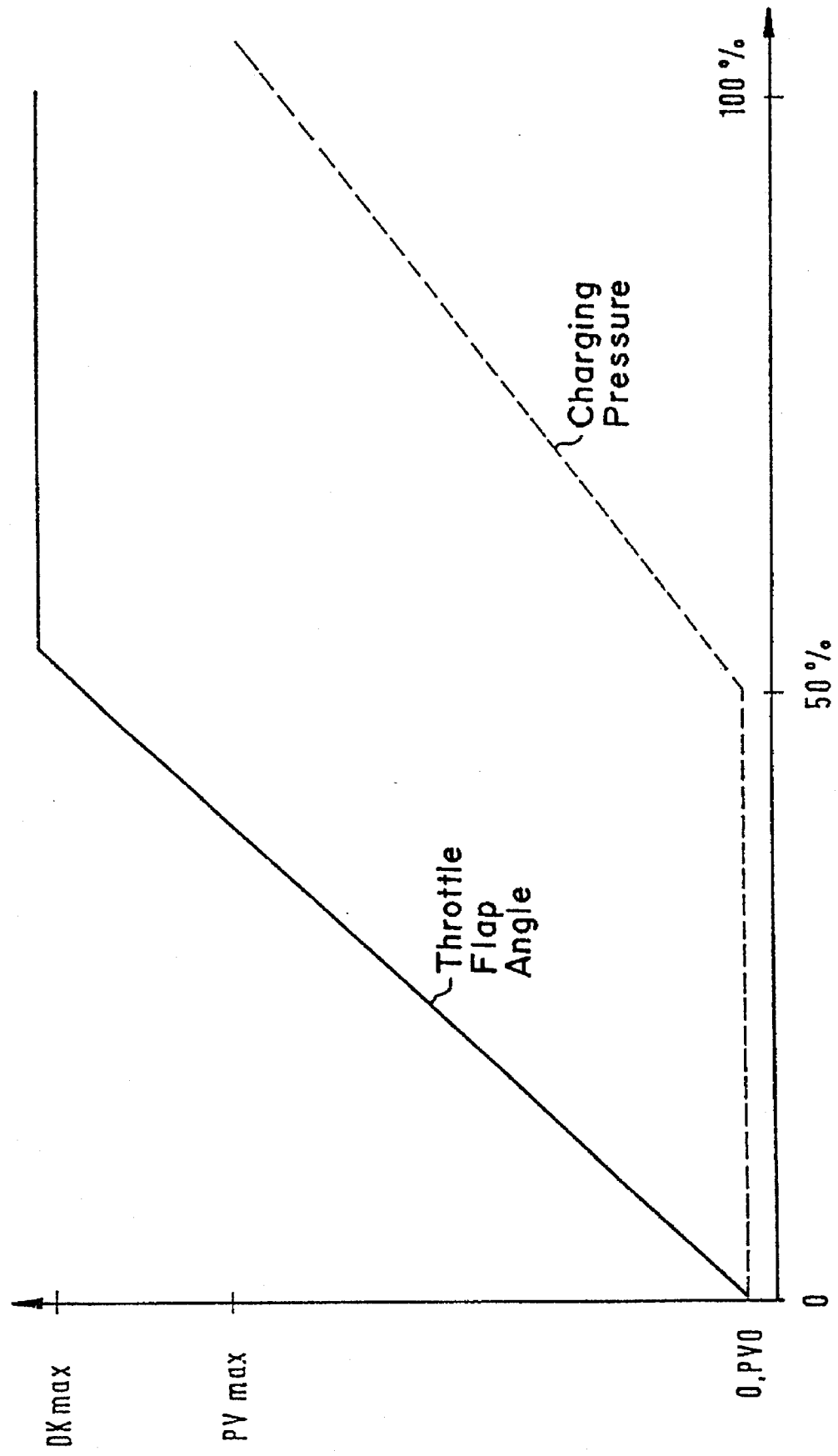

FIG. 3 is an overview flowchart showing how the method of the applicants' invention is realized with the aid of a computer program. After the start of the subprogram, the following are read in the first step 200: the accelerator pedal position beta, the actual throttle flap angle DKact, the actual charging pressure PVact, the engine rpm Nmot and additional operating variables which are inputted for forming the desired value. Thereafter, in step 202, the throttle flap set value DKdes is determined first from the characteristic field 100 as a function of accelerator pedal position beta and engine rpm. Additional operating variables such as engine temperature, elevation above sea level, battery voltage, road speed, transmission ratio and the like can also be factored in. Likewise, in the next step 204, the charging pressure desired value PVdes is read out as a function of the accelerator pedal position beta as well as of the engine rpm and, if required, of additional operating variables in accordance with characteristic field 102. Thereafter, in step 206, an output signal for driving the throttle flap actuator is generated in accordance with a pregiven control strategy as a function of throttle flap desired value and throttle flap actual value and is outputted for adjusting the throttle flap. In the next step 208, a drive signal for the bypass valve of the turbocharger is formed in a similar manner as a function of the set value PVdes and the actual value PVact or, in another embodiment, as a function of the set value PVdes alone. The drive signal value is then emitted for setting the charging pressure. Thereafter, the subprogram is ended and repeated at a pregiven time. FIG. 4 shows the preferred characteristic field curves. The accelerator position value beta is plotted along the horizontal axis from 0% to 100%; whereas, the throttle flap desired value DKdes is plotted from zero to its maximum value DKmax along the solid vertical line. The charging pressure desired value is plotted along the broken line from its minimum value PV0 to its maximum value PVmax. It is significant that in the first range from 0% to 50% of the accelerator pedal deflection, the charging pressure desired value remains essentially at its minimum value; whereas, the throttle flap desired value is pregiven as superproportional to the accelerator pedal position. This leads to a superproportional opening of the throttle flap for the accelerator pedal position with the throttle flap already being at its maximum value at 50%. The linear dependency shown serves only to provide a clear diagram. The characteristic curve can be dependent on rpm and exhibit a progressive or degressive trace. If the accelerator pedal is depressed more than 50%, then the throttle flap remains at its maximum position value and the charging pressure is increased in accordance with a pregiven characteristic curve. This too is shown as a linear dependency in FIG. 4 so that a clear overview is provided. In advantageous embodiments, the characteristic curve can be progressive, degressive or a mixture of both variations. The throttle flap position as well as the charging pressure are at their maximum values for the full-load position of the accelerator pedal at 100%.

In summary, the procedure provided by the invention permits the engine to be operated at optimal efficiency with the aid of independent control of throttle flap and charging pressure as a function of accelerator pedal position. In this way, fuel consumption is reduced.

In addition to the relationship shown in FIG. 4 and the alternatives described, it has been shown in an embodiment to be advantageous that the charging pressure can be shifted over a larger range, even the entire range, of the accelerator pedal deflection in dependence upon driver command while the throttle flap position is opened only in a preselected range of the accelerator pedal deflection (as shown in FIG. 4) up to its maximum value in dependence upon the accelerator pedal position. Only the charging pressure is controlled in dependence upon driver command for the open position for the throttle flap.

Also, any desired combinations of the described characteristic curves for throttle flap position and charging pressure can be utilized.

In a preferred embodiment of a road-speed controller, the input value of the road-speed controller is used in lieu of the accelerator pedal position for adjusting the throttle device which input value is dependent upon the difference between the desired and actual values.

It is understood that the foregoing description is that of the preferred embodiments of the invention and that various changes and modifications may be made thereto without departing from the spirit and scope of the invention as defined in the appended claims.

What is claimed is:

1. A method for controlling the drive power of a motor vehicle having a spark-ignition engine equipped with an air charger and a throttle device through which air is supplied to the engine, the drive power of the engine being controlled via a control means by adjusting said throttle device and said air charger, the method comprising the steps of:

measuring variables ($\beta$, Nmot) representing a driver command;

reading said variables ($\beta$, Nmot) into said control means;

determining a desired adjusting value (DKdes) for said throttle device in dependence upon said driver command;

determining a desired pressure value (PVdes) for said air charger in dependence upon said driver command;

associating said desired adjusting value (DKdes) and said desired charger pressure valise (Pvdes) to said driver command so that said drive power is controlled by adjusting an air charging pressure of said air charger in dependence upon said driver command in at least a first range of values thereof while said throttle device is at a constant adjustment;

forming a first adjusting signal (DK) for said throttle device in dependence upon said desired adjusting value (DKdes);

forming a second adjusting signal (TV) for said air charger in dependence upon said desired charger pressure value (Pvdes); and, driving said throttle device and said air charger with said first adjusting signal (DK) and said second adjusting signal (TV), respectively.

2. The method of claim 1, said driver command also having a second range of values; the method comprising the steps of:

controlling said drive power in said first range by adjusting said throttle device in dependence upon said driver command while said charging pressure remains substantially constant; and, controlling said driving power in said second range essentially by adjusting said air charging pressure in dependence upon said driver command while the adjustment of said throttle device remains substantially constant.

3. The method of claim 1, wherein said driver command is determined by a deflection of an operator-controlled element such as an accelerator pedal or said driver command is determined by an input value of a road speed controller; and, wherein said desired adjusting value (DKdes) for said throttle device is pregiven in dependence upon the extent of the deflection of said accelerator pedal or the input value of said road speed controller and the engine rpm (Nmot).

4. The method of claim 1, wherein said driver command is determined by a deflection of an operator-controlled element such as an accelerator pedal or said driver command is determined by an input value of a road speed controller; and, wherein said air charging pressure is adjusted in dependence upon the extent of the deflection of the accelerator pedal or the input value of said road speed controller and the engine rpm (Nmot).

5. The method of claim 4, wherein said charging pressure is held to a minimum value in said first range when said accelerator deflections are small corresponding to low values of said driver command; whereas, said desired adjusting value (DKdes) of said throttle device changes from its minimum position to the region of its maximum position or to its maximum position.

6. The method of claim 2, wherein said throttle device remains essentially constant in one position for larger accelerator pedal deflections corresponding to larger values of said driver command in said second range of values; and, said one position being a position of said throttle device wherein no or only a slight throttling of the air flow takes place by the actuating element of said throttle device; and, whereas said desired adjusting value (DKdes) is pregiven in dependence upon said deflection of said accelerator pedal corresponding to said input value.

7. The method of claim 2, wherein said first range of said driver command extends from zero to a first point where said first point corresponds to 30% to 80% of the deflection of said accelerator pedal; and, said second range extends from said first point to full deflection of said accelerator pedal corresponding to the maximum value of said input quantity.

8. The method of claim 7, wherein said first point corresponds to 50% deflection of said accelerator pedal.

9. The method of claim 2, wherein said driver command has a third range of values; only said throttle device is adjusted in said first range; both the charging pressure and said throttle device are adjusted in said second range; and, only said air charging pressure is adjusted in said third range.

10. The method of claim 2, wherein said charging pressure and said throttle device are adjusted in said first range in dependence upon said driver command; and, only said air charging pressure is adjusted in said second range in dependence upon said driver command.

11. The method of claim 1, wherein said desired adjusting value (DKdes) and said desired pressure value (PVdes) are pregiven so as to cause an optimal torque curve of the engine or an optimal consumption of fuel of the engine or a minimum of exhaust gas emission.

12. The method of claim 1, wherein said throttle device opens disproportionately to said driver command.

13. An apparatus for controlling the drive power of a motor vehicle having a spark-ignition engine equipped with an air charger and a throttle device through which air is supplied said engine, said apparatus comprising:

detector means for detecting a variable ($\beta$, Nmot) indicative of a driver command and for generating an input signal representing said driver command;

a control means for receiving said input signal and to provide first and second control signals for controlling said throttle device and said air charger, respectively, to adjust said air supplied to said engine; and, said control means functioning to:
- (a) supply a first desired adjusting value (DKdes) for said throttle device in dependence upon said driver command;
- (b) supply a second desired adjusting value (PVdes) for said air charger in dependence upon said driver command;
- (c) control said drive power by adjusting an air charging pressure of said air charger in dependence upon said driver command in at least a first range of values thereof while said throttle device is at a constant adjustment;
- (d) generate said first and second control signals in correspondence to said first desired adjusting value (DKdes) and said second desired adjusting value (PVdes); and, said throttle device and said air charger being connected to said control means to receive said first and second control signals, respectively.

* * * * *

UNITED STATES PATENT AND TRADEMARK OFFICE
CERTIFICATE OF CORRECTION

PATENT NO. : 5,645,033
DATED : July 8, 1997
INVENTOR(S) : Martin Person, Martin Streib, Thomas Moessner and Tobias Roulet It is certified that error appears in the above-indentified patent and that said Letters Patent is hereby corrected as shown below:

In column 5, line 15: delete "o" and substitute -- of the magnitude of the drive signal. -- therefor.

In column 5, line 16: delete "The basic character drive signal".

In column 6, line 13: between "in" and "the", insert -- in --.

In column 7, line 43: delete "valise (Pvdes)" and substitute --value (PVdes) -- therefor.

In column 7, line 55: delete "(Pvdes)" and substitute -- (PVdes) -- therefor.

In column 8, line 64: between" supplied" and "said", insert -- to --.

Signed and Sealed this

Fourteenth Day of July, 1998

Attest:

BRUCE LEHMAN

*Attesting Officer*          *Commissioner of Patents and Trademarks*